United States Patent [19]

McGregor et al.

[11] Patent Number: 4,708,775

[45] Date of Patent: Nov. 24, 1987

[54] DISPOSAL OF WASTES WITH SOLVENT RECOVERY

[75] Inventors: Ian R. McGregor, Mississauga; D. Keith Jackson, Don Mills; Walter F. M. Brown; Kenneth Burrell, both of Mississauga, all of Canada

[73] Assignee: Anachemia Solvents Limited, Mississauga, Canada

[21] Appl. No.: 752,838

[22] Filed: Jul. 8, 1985

[51] Int. Cl.$^4$ .............................................. B01D 3/06
[52] U.S. Cl. ........................................ 203/40; 203/88; 203/100; 203/DIG. 25; 110/236; 122/7 R; 134/12; 134/38; 159/29; 159/47.3; 159/DIG. 29; 202/175; 202/176; 202/197; 202/234
[58] Field of Search ...................... 203/40, 100, 27, 21, 203/DIG. 25, 88, 98, 90, 86, 99, DIG. 16, DIG. 8, 39, 89; 202/170, 176, 197, 175, 234, 236; 159/DIG. 29, 16.1, 2.1, 47.3, 29; 134/12, 38, 10, 11; 110/229, 236; 122/7 R; 55/92, 238, 257, 242; 201/12

[56] References Cited

U.S. PATENT DOCUMENTS

| | | | |
|---|---|---|---|
| 1,698,345 | 1/1929 | Puening | 201/12 |
| 2,905,596 | 9/1959 | Findlay | 203/86 |
| 2,984,602 | 5/1961 | Nevens et al. | 201/12 |
| 3,442,769 | 5/1969 | Heinz | 203/100 |
| 3,480,515 | 11/1969 | Goeldner | 202/197 |
| 3,642,583 | 2/1972 | Greenberg et al. | 202/234 |
| 3,843,462 | 10/1974 | Phillips | 203/100 |
| 4,157,245 | 6/1979 | Mitchell | 201/12 |
| 4,375,976 | 3/1983 | Potter | 55/92 |
| 4,409,064 | 10/1983 | Vora et al. | 202/197 |
| 4,478,685 | 10/1984 | Mortenson | 203/86 |
| 4,496,431 | 1/1985 | Fowler | 203/100 |

*Primary Examiner*—Wilbur Bascomb
*Attorney, Agent, or Firm*—Bachman & LaPointe

[57] ABSTRACT

Volatile matter especially solvents is recovered from waste material using a hot granular material such as sand, as a heat carrier to drive off the solvents, and as a carrier for the non-volatile resin content of the waste; the resins are thermally decomposed in reactions which provide heat to maintain the granular material hot and the granular material is continuously circulated; the exhaust gases from the thermal decomposition of the resins can be used as a source of heat outside the system.

15 Claims, 1 Drawing Figure

DISPOSAL OF WASTES WITH SOLVENT RECOVERY

BACKGROUND OF THE INVENTION

1. Field of the Invention

This invention relates to a solvent recovery process and to a solvent recovery process which provides heat recovery processes.

The invention also relates to apparatus for carrying out such processes.

2. Description of the Prior Art

Disposal of chemical wastes and recovery of useful components thereof is a significant environmental problem.

Such chemical wastes include sludge waste which is the still bottoms from the distillation of washings from liquid solvent paint wastes, adhesive wastes and printing ink wastes. Typically such wastes will include organic solvent, water and resins including synthetic resins, polymers and copolymers and inorganic solids.

In the past, still bottom sludges have been disposed of by hauling to a waste disposal site or by incineration. Incineration resulted in emissions which may be damaging to the environment and, in some cases, exceed environmental standards set by Government. Dumping in a disposal site may result in ultimate leaching of the sludge into aquifers, or water courses.

There have been attempts to recover the solvents from still bottoms. One prior proposal employs a double drum dryer, however, this suffers the problem that the residue sticks to the drum and makes continuation of the process difficult.

A further roadblock to recovery of products of value from the waste by prior processes is the high cost of recovery, and the low value of recovered solvent compared to the price of virgin solvent on the market.

SUMMARY OF THE INVENTION

It is an object of this invention to provide a process for the economic recovery of solvent from chemical waste, especially still bottom sludges.

It is a further object of the invention to provide such a process which additionally provides for disposal of the residue after solvent removal in a manner which meets economic and environmental requirements.

It is a further object of the invention to provide such a process of solvent recovery which permits recovery of heat in an efficient manner.

It is still another object of the invention to provide apparatus for carrying out the aforementioned processes.

In accordance with the invention, volatile matter, more particularly solvents, are separated from waste which may be in fluid waste or sludge form, using a granular substrate, for example sand, as a heat carrier.

The invention contemplates the thermal degradation of the non-volatile residue carried by the substrate, for example, by pyrolysis, combustion or a combustion of pyrolysis and combustion to produce a gaseous exhaust. In the case of a combustible exhaust, the combustible gases may be burned and the heat employed, for example, to generate steam. In the case of a non-combustible exhaust, the hot non-combustible gases may be used directly as a source of heat, for example, to produce steam by heat exchange.

In accordance with another aspect of the invention, there is provided an apparatus for the treatment of waste to recover volatile matter which includes a reactor to provide a source of heated granular substrate and a closed chamber for effecting contact between the substrate and waste to be treated; the chamber has an outlet for removal of volatile matter which has been volatilized in the chamber. The reactor and chamber are connected both for passage of the hot substrate from the reactor to the chamber and for return of hot substrate and non-volatile residue of the waste to the reactor.

DESCRIPTION OF PREFERRED EMBODIMENTS

The granular substrate serves as a carrier of heat for the volatilization or vaporization of the volatile matter, and also as a carrier for the residue comprising the non-volatile content of the waste, which is conveyed with the granular substrate to the thermal degradation stage in the reactor.

The preferred granular substrate is sand, more particularly silica sand, however, other inert particulate materials, for example, alumina pellets can be employed. It is also possible to use other particulate materials in admixture with the principal granular substrate, for example, there may be employed a mixture of silica sand with one or more of limestone, magnesite, or metallic pellets, for example, steel pellets.

Suitably the granular substrate has a mean diameter particle size of 0.05 mm to 5 mm, and preferably 0.5 mm to 1.5 mm.

The waste material will vary in composition, but will contain a significant proportion of volatile matter, specifically recoverable organic solvents. Typically the solvents will comprise both oxygenated solvents, for example, alcohols, ketones and ethers, and hydrocarbon solvents, generally aromatic hydrocarbon solvents.

A typical paint waste which can be employed in the invention contains about 45 to 66%, by weight, of solvent, about 2 to 22%, by weight, of water, about 16 to 40%, by weight, of nonvolatile resins and about 4 to 14%, by weight, of solids, determined as ash. The solvent component will typically comprise about 35 to 45%, by weight, of oxygenated solvents and 55 to 65% of hydrocarbon solvents.

In operation the granular substrate is heated in a reactor to an elevated temperature. The heating is conveniently achieved by introducing hot air into the granular substrate and establishing a fluidized or partially fluidized bed of the granular substrate. This ensures adequate movement of the granular substrate in the reactor so that effective transfer of heat to the substrate is achieved. It is especially preferred to form a spouted bed of the granular substrate, which may be considered a partially fluidized bed.

The heated granular substrate is fed in a continuous manner from the reactor to a closed chamber into which the waste to be treated is introduced. The heat of the substrate volatilizes or vaporizes the volatile matter comprising solvents and water in the waste and this is removed from the chamber, and condensed. After separation of the solvents from the water, the solvents are stored and may be subjected to further separation steps by, for example, fractional distillation. Preferably the volatized matter is subject to a cleansing step to remove non-volatile material which may have been entrained therein, prior to or after the condensation.

The heated granular substrate and the waste are mixed and blended in the closed chamber to effect transfer of heat and drive off the volatile matter.

It is important to control the temperature of the heated granular substrate in the system so that an appropriate temperature is established in the closed chamber. The temperature must be sufficiently high to volatilize or vaporize the solvents and water but also to maintain the mixture of granular substrate and nonvolatile residue free flowing. If the temperature in the closed chamber is too low, the mixture tends to agglomerate or cake forming large lumps which are difficult to handle.

On the other hand, the temperature must not be so high as to cause significant thermal decomposition or degradation of the non-volatile residue, since the non-volatile residue is to be employed in a subsequent stage of the process.

Generally the temperature in the closed chamber should be at least 175° C. and below 600° C. Preferably the temperature is about 250° C. to about 470° C.

The mixture of hot granular substrate and non-volatile residue is fed back to the reactor. The non-volatile residue is thermally decomposed by pyrolysis, combustion or a combination of pyrolysis and combustion. It is found that the heat generated in this thermal decomposition is sufficient to supply the heat needs of the granular substrate. The granular substrate can thus be reused in a continuous cycle. Thus, the process is self-sustaining with respect to heat needs, after the initial set up.

DETAILED DESCRIPTION OF THE DRAWING

Figure 1:
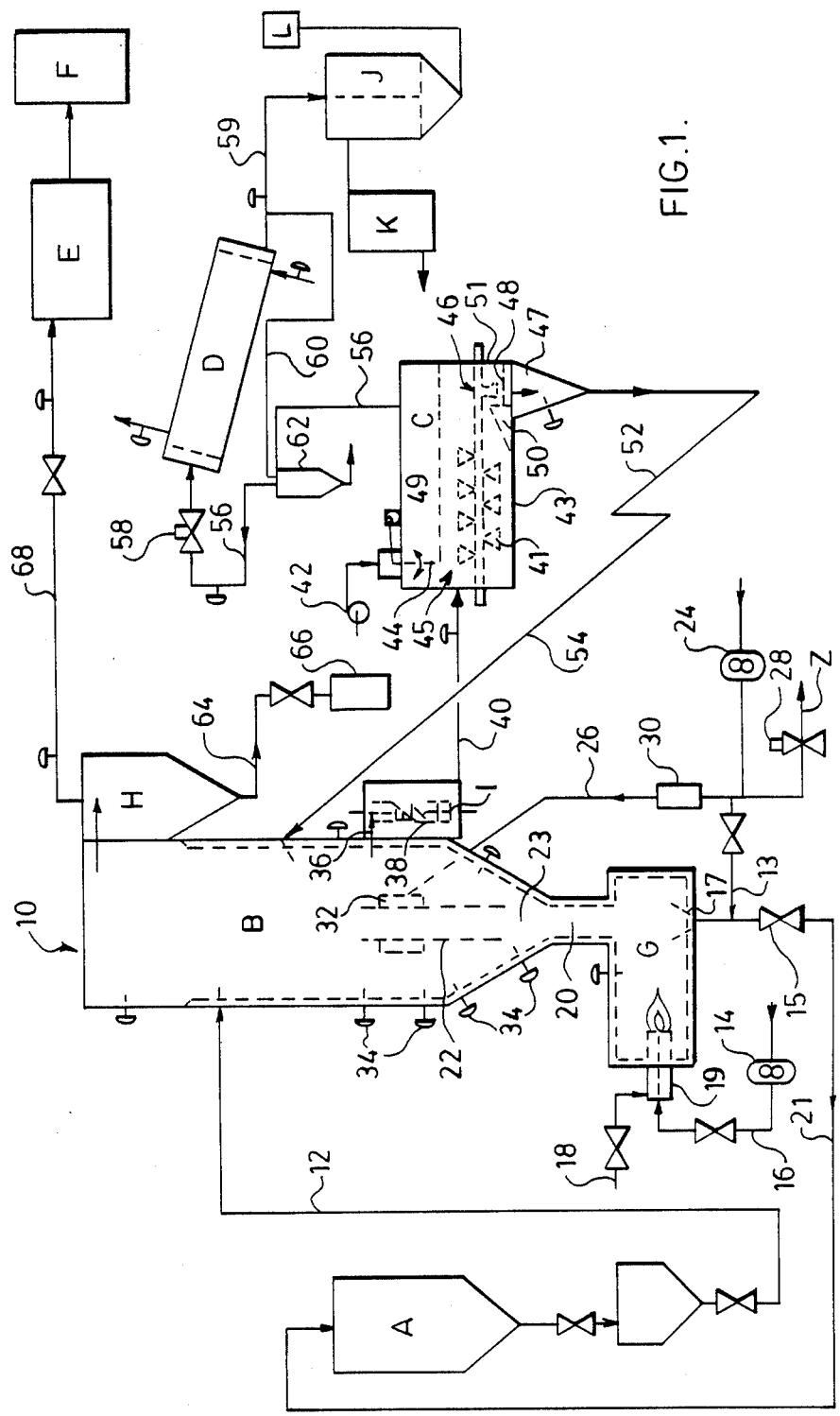
FIG. 1 is a schematic representation of an apparatus for carrying out the process of the invention.

With reference to the drawing, an apparatus 10 for solvent recovery from a sludge, and heat recovery from the system, comprises a storage hopper A for sand, a reactor B, a blender-flasher C, a condenser D, an incinerator E and a waste heat boiler F.

A preheater G provides start-up heat to reactor B and a cyclone H is disposed between reactor B and incinerator E.

A mixing pot I is disposed between reactor B and blender flasher C.

Condenser D communicates with a decanter tank J. An upper part of decanter tank J communicates with a solvent storage tank K and a lower part of decanter tank J communicates with a water container L.

Sand line 12 communicates storage hopper A with reactor B.

An air blower 14 supplies air through an air line 16 to preheater G and no oil line 18 supplies oil to an oil burner 19 in preheater G.

A throat 20 for passage of heated air extends from preheater G to the base of reactor B and communicates with a draft tube 22 extending into the interior of reactor B. An open annulus 23 is defined between throat 20 and the mouth of draft tube 22.

A separate air blower 24 supplies air via an air line 26 to reactor B. Air line 26 includes a branch to bleed valve 28 to regulate the flow of air a rotameter 30 which measures the amount of air and a donut collar 32 disposed around draft tube 22 which distributes the air in the interior of reactor B.

Thermocouples 34 located in reactor B and the sand bed contained therein measure the reaction temperature in reactor B.

A slot 36 in the wall of reactor B communicates reactor B with mixing pot I for passage of sand thereto. Vertical paddles 38 in mixing pot I are rotated by a slow speed gear motor and maintain a uniform flow of sand to a screw conveyor 40 which feeds the sand to blender-flasher C.

A sludge pump 42 feeds waste-sludge to a nozzle 44 in blender-flasher C, in this instance an oscillating nozzle.

Blender-flasher C comprises a closed housing 43 having an upper flash chamber 49 and a lower blender chamber 51. A paddle blender 46 having paddles 41, is mounted for rotation in chamber 51; chamber 51 has an inlet 45 and an outlet 47; a bar screen 48 is disposed over outlet 47, and a weir 50 is disposed inwardly of outlet 47.

Outlet 47 communicates with a sequence of dirty sand screws 52 and 54, which connect with reactor B.

A vapor line 56 connects blender-flasher C with condenser D and includes a control valve 58 with variable travel.

A condensate line 59 communicates condenser D with decanter tank J.

Recirculation line 60 connects condensate line 59 with a cyclone spray device 62 in vapor line 56.

An ash screw 64 connects cyclone H with an ash drum 66; and an insulated gas line 68 connects cyclone H with incinerator E.

An air line 13 communicates air blower 24 to a venturi 15 of a sand drain 17 in preheater G. Air line 21 communicates venturi 15 to sand hopper A.

In operation, sand of a specified grain size or size distribution is fed from storage hopper A through sand line 12 to reactor B and a bed of sand is formed therein.

Air blower 14 provides air under pressure through air line 16 to preheater G, where it is heated to provide reaction heat, and thence delivered through throat 20 to the interior of reactor B, particularly to draft tube 22, to spout the bed of sand in reactor B. The throat 20 and draft tube 22 assist in the spouting.

In the spouting of the sand bed, the preheated air from preheater G is jetted through throat 20 and draft tube 22 and up through the sand bed entraining sand in annulus 23 in its passage. A jet of sand and air erupts from the bed as a spout or fountain to form the spouted bed. The spouting provides intimate contact between the sand particles and the heated air. The spouted sand particles fall back into the bed around draft tube 22 to annulus 23 and are again jetted by the air.

The air in preheater G is heated by oil burner 19 supplied with oil through oil line 18.

When the desired temperature of the sand bed is reached the sand circulation system is set in operation. This circulation system particularly includes the vertical paddles 38, the screw conveyor 40, the paddle blender 46 and the dirty sand screws 52 and 54.

The speed of the different elements of the sand circulation system is adjusted to achieve a balanced and uniform circulation of hot sand.

A portion of the spouted sand exits from reactor B through slot 36 and enters mixing pot I. The vertical paddles 38 in the mixing pot I are turned by a slow speed gear motor (not shown) and maintain uniform flow of the hot sand downwardly through the mixing pot I to the screw conveyor 40. An ammeter in the electrical circuits of the slow speed gear motor which drives the vertical paddles 38 provides an indication of the level of the sand in the reactor B.

The sand passes from mixing pot I to screw conveyor 40 which controls the rate of flow of sand to the inlet 45 of blenderflasher C. Inside the blender-flasher C, the paddle blender 46 advances the sand slowly towards the outlet 47. The pitch of the paddles of paddle blender 46 controls the flow of the sand and the weir 50 adjacent outlet 47 governs the level of sand maintained in blender-flasher C.

Sludge pump 42 feeds waste sludge to oscillating nozzle 44 in the interior of blender-flasher C, through a flexible steel line. The oscillating nozzle 44 moves back and forth in blenderflasher C and distributes the waste sludge onto the advancing sand as it is conveyed through blender-flasher C by the paddle blender 46.

The heat content of the hot sand flashes off the volatile matter in the waste sludge, including water and the desired solvents.

The non-volatile matter in the waste sludge is intimately mixed with the sand in blender-flasher C, and the sand particles are coated with non-volatile matter.

The temperature in blender-flasher C is maintained at an appropriate level to flash off the volatile matter while, at the same time, avoiding cracking or thermal degradation of the nonvolatile matter. The temperature level is also determined to maintain the mixture of sand and non-volatile matter, which is referred to as dirty sand, in a free flowing, essentially noncaked form. Preferably, the temperature in blender-flasher C will be in the range of 250° to 470° C. The temperature drop through the blender is preferably limited to 140 Celsius degrees. Limiting the degree of thermal degradation or cracking of non-volatile matter helps to insure solvent quality and, in addition, the non-volatile matter is needed in a subsequent stage of the continuous system.

Suitably the temperatures in reactor B and blender-flasher C are displayed on a computer screen (not shown) and recorded as a time-temperature graph. Appropriate adjustments are made in the system to control the temperature at an appropriate level, as the process continues.

The dirty sand is advanced through blender-flasher C by paddle blender 46 and leaves via outlet 47. Bar screen 48 and paddles 41 serve to break up any lumps, agglomerates or caked masses that form, and prevent such lumps from leaving the blender-flasher C and entering dirty screws 52 and 54.

The dirty sand is conveyed to reactor B by the dirty sand screws 52 and 54. Two dirty sand screws are appropriate to avoid steep angles in raising the dirty sand in its passage to the reactor B.

When sufficient combustible matter has accumulated on the dirty sand in reactor B, air is provided to reactor B by air blower 24 through air line 26 and donut collar 32, thereby providing additional air to promote a self-sustaining reaction in reactor B initiated by preheater G. The thermocouples 34 measure the reaction temperature.

The non-volatile matter in the dirty sand in reactor B is thermally decomposed at the elevated temperature in reactor B to form pyrolysis gases, combustion gases, or both. This thermal decomposition is exothermic and provides heat to sustain itself. Thus, when the thermocouples 34 indicate temperatures such that a self-sustaining reaction is occurring, the burner 19 is turned off. The flow of air in air line 26 is controlled by valve 28, to help maintain a steady state reaction, promote pyrolysis, and a starved air combustion mode for the production of pyrolysis gas. The amount of secondary air is measured by the rotameter 30.

The gaseous exhaust from reactor B, which in the particular embodiment illustrated in FIG. 1, comprises pyrolysis gases, char and ash pass from reactor B through a cyclone H where coarse particles and ash are separated from the pyrolysis gas and delivered via ash screw 64 to ash drum 66 for disposal.

The pyrolysis gases pass from cyclone H through the insulated line 68 to incinerator E. The combustible pyrolysis gases are burned in incinerator E and the hot flue gases produced pass to the waste heat boiler F where the heat of the gases is employed to produce steam, by heat exchange. In this way, heat is recovered from the process system and exploited.

The volatile matter flashed off in blender-flasher C passes from flash chamber 49 along vapor line 56 through cyclone spray device 62 to condenser D where it is condensed. The control valve 58 is adjusted to establish a pressure in flash chamber 49 higher than the pressure in reactor B to prevent flow of pyrolysis gases from reactor B to flash chamber 49.

The condensate from condenser D, which comprises water and solvents, is pumped through condensate line 59 to decanter tank J where it separates into an upper solvent layer and a lower aqueous layer.

the aqueous layer is fed from tank J to water container L and thence to a sewer (not shown) under gravity.

The solvent layer is decanted by gravity to solvent storage tank K.

A portion of the condensate in condensate line 59 is bled off through recirculation line 60 which connects upstream with vapor line 56.

The condensate recirculated through line 60 into line 56 upstream of cyclone spray device 62 washes solid deposits entrained by the vapor from the wall of vapor line 56. Cyclone spray device 62 in vapor line 56 separates solid particles entrained in the vaporized volatile matter before passage of the vapor to condenser D.

Granular substrate may be moved from reactor B when the process is shut down by air line 21. In this operation blower 14 is stopped, air ceases to flow into reactor B from preheater G and granular substrate is free to drop into preheater G above sand drain 17.

Valves in air line 13 are opened to provide motive air to venturi 15 from blower 24. Valves in air line 21 are opened to allow air to pass through venturi 15 and line 13 to sand hopper A. Venturi 15 entrains granular substrate in the air stream which deposits the granular substrate in sand hopper A This operation is terminated when reactor B has been emptied of granular substrate.

Thus, by means of the present invention an efficient recovery of valuable solvents from waste sludge is obtained, on a continuous basis, employing waste material and a relatively inexpensive naturally occurring heat carrier such as sand. After set up the process is largely self-sustaining, and heat is recovered from the process.

The thermal decomposition in the reactor B being exothermic is a source of heat which must be balanced with the various heat sinks in the total system. These heat sinks include the convection and radiation losses, the heat of pyrolysis, the sensible heat carried away by the exhaust gases from reactor B, and the latent and sensible heats carried overhead by the volatile portion of the sludge in the blender-flasher C. Of these several heat sinks, the most important is the blender-flasher C, and the heat content here is controlled by the sludge feed rate.

The rate of heat release in reactor B is dictated by the volume of air flow introduced into reactor B, and is suitably operated in a starved air mode. In this way, a thermal balance or thermal steady state is established between the air flow into reactor B, which controls heat release, and the sludge feed rate. The process is maintained in balance by adjusting the air flow and the sludge feed.

We claim:

1. A process for recovering volatile matter from waste containing volatile matter and non-volatile matter comprising,
    feeding a hot granular substrate into a closed chamber having an outlet for volatile matter and an outlet for said substrate and non-volatile matter,
    contacting waste containing volatile and nonvolatile matter with said hot granular substrate in said chamber at a temperature effective to vaporize said volatile matter and forming a substantially free-flowing, noncaked mixture of said substrate and said non-volatile matter in said chamber, in which the granules of said hot granular substrate are coated with said non-volatile matter,
    recovering the vaporized volatile matter from said chamber,
    feeding said non-caked mixture from said chamber to a reactor,
    thermally decomposing said non-volatile matter in said reactor to produce a gaseous exhaust and free said hot substrate of non-volatile matter, and
    recycling said hot substrate to said closed chamber.

2. A process according to claim 1, wherein said gaseous exhaust comprises combustible pyrolysis gases and including a step of burning said pyrolysis gases.

3. A process according to claim 2, wherein said heat produced by the burning of said pyrolysis gases is passed to a waste water boiler to generate steam.

4. A process according to claim 2, wherein said waste and said hot substrate are continuously blended in said closed chamber and said volatile matter comprising solvents and water is flashed off at a temperature of about 250° C. to 470° C.

5. A process according to claim 4, wherein said substrate comprises silica sand having a particle size of 0.5 to 1.5 mm and said waste comprises a liquid solvent paint waste containing solvents and paint resins.

6. A process according to claim 5, including condensing the flashed off volatile matter and separating a solvent layer from an aqueous layer.

7. A process according to claim 6, wherein the flashed off volatile matter is passed through a cyclone to remove entrained particulate matter prior to said condensing and a portion of the condensed volatile matter is recycled through said cyclone and condenser.

8. A process according to claim 1, wherein the waste is selected from the group consisting of waste cleaning fluids and still bottom sludges produced from the distillation of waste solvent mixtures.

9. A process according to claim 8, wherein said waste comprises said still bottom sludges and said waste solvent mixtures comprise paint solvents.

10. A process according to claim 1, wherein a feed of said granular substrate and said feed of said non-caked mixture are spouted in said reactor, and said hot substrate is continuously recycled through said reactor and closed chamber, the thermal decomposition of said non-volatile matter of said non-caked mixture in said reactor being carried out in a thermally self-sustaining reaction effective to maintain the heat need of the process, the recycling rate of said hot granular substrate being controlled to provide a continuous circulation of the substrate, and supplying air to said reactor to maintain said thermally sustaining reaction with heat developed in the thermal decomposition of the non-volatile matter of said non-caked mixture.

11. A process for recovering solvents from a fluid sludge waste containing solvents and non-volatile matter, comprising,
    continuously feeding hot granular sand into an inlet end of an enclosed blender-flasher vessel,
    feeding said fluid sludge waste into said vessel to contact said hot granular sand,
    continuously blending said hot sand and fluid sludge waste in said vessel,
    flashing off volatile matter comprising solvents, in said fluid sludge waste in said vessel, and forming a dirty sand in said vessel comprising said hot granular sand coated with non-volatile matter from said fluid sludge waste,
    advancing said dirty sand through said vessel towards an outlet end,
    removing the flashed off volatile matter from said vessel, condensing it and recovering the solvents from the condensate, and feeding the dirty sand from said vessel to a reactor.
    supplying air to said reactor,
    thermally decomposing said non-volatile matter of said dirty sand in said reactor to produce pyrolysis gases and a cleansed hot sand in a thermally self-sustaining reaction effective to maintain the heat need of the process,
    recycling the cleansed hot sand to the feed to said blender-flasher vessel, and
    recovering the pyrolysis gases and burning them to provide heat externally of the process,
    the feeding rate of the hot sand and dirty sand and the recycling rate of the cleansed hot sand being controlled to provide a continuous circulation of the sand, said supply of air to said reactor being effective to maintain said thermally sustaining reaction with heat developed in the thermal decomposition of said non-volatile matter of said dirty sand.

12. A process according to claim 11, wherein the thermally sustaining reaction is effective to maintain the hot sand at a temperature of 250° C. to 470° C. in said vessel.

13. A process according to claim 12, wherein said sand has a particle size of 0.5 to 1.5 mm, and the sand is maintained in a spouted bed in said reactor by injection of air into the bed.

14. A process for recovering solvents from still bottom sludge with development of a source of heat comprising:
    continuously feeding hot granular sand having a particle size of 0.5 to 1.5 mm into an enclosed blender-flasher vessel having an inlet end and an outlet end,
    advancing said hot granular sand in said vessel from said inlet end towards said outlet end, said sand being maintained at a temperature in the range of 250° C. to 470° C.,
    continuously feeding a fluid still bottom sludge into contact with said hot granular sand adjacent said inlet end, continuously blending said hot sand and fluid still bottom sludge in said vessel, flashing off volatile matter comprising solvents, in said fluid still bottom sludge, in said vessel, without cracking and thermal degradation of non-volatile matter in said still bottom sludge, and forming a free-flowing, noncaked dirty sand in said vessel, said dirty sand comprising granules of said hot granular sand coated with said nonvolatile matter from said still bottom sludge, advancing said dirty sand through said vessel to said outlet end without cracking and thermal degradation of said non-volatile matter, removing the flashed off volatile matter from said vessel, condensing it to form a condensate and recovering solvents from the condensate, feeding said dirty sand from said vessel to a reactor, thermally decomposing said non-volatile matter of said dirty sand in said reactor to produce pyrolysis gases and a cleansed hot granular sand, recycling the cleansed hot sand to the feed to said said blender-flasher vessel, and recovering the pyrolysis gases as a source of heat energy.

15. A process according to claim 14, including feeding granular sand and hot air to said reactor to form the feed of hot granular sand, and feeding air to said reactor for the thermal decomposition of said non-volatile matter of said dirty sand in said reactor, the feeding rate of the hot granular sand to said vessel, feeding rate of the dirty sand to said reactor, the recycling rate of the cleansed hot sand and the feed rate of granular sand to said reactor being controlled to provide a continuous circulation of sand, and said supply of air to said reactor being effective to maintain said thermal decomposition thermally self-sustaining with heat developed in said thermal decomposition maintaining the heat need of the process.

* * * * *